PULSE WIDTH MODULATED POWER AMPLIFIER

Filed Jan. 16, 1967

INVENTORS
Keith M. Chirgwin, Robert J. Wurm
and Lawrence J. Stratton
BY
Bosworth, Sessions,
Herrstrom and Knowles
ATTORNEYS United States Patent Office 3,509,445
Patented Apr. 28, 1970

3,509,445

PULSE WIDTH MODULATED POWER AMPLIFIER

Keith M. Chirgwin, Palos Verdes Estates, Calif., Robert J. Wurm, Greendale, Wis., and Lawrence J. Stratton, Lexington, Mass., assignors to Lear Siegler, Inc., Santa Monica, Calif., a corporation of Delaware
Filed Jan. 16, 1967, Ser. No. 609,672
Int. Cl. H02m *1/12, 7/52;* H03f *3/38*
U.S. Cl. 321—9 3 Claims

ABSTRACT OF THE DISCLOSURE

An electrical power amplifier for providing an alternating current output of a desired frequency comprising a parallel static inverter controlled by trigger pulses provided by the output of saturable core pulse transformers. The transformers are connected to and provide output pulses in accordance with a high frequency alternating current signal source whose output is amplitude modulated by a lower frequency alternating current source. The lower frequency is the desired output frequency of the power amplifier.

Numerous attempts have been made in an effort to provide an alternating current source from static inverters in which the frequency of the signal delivered to the load is relatively high in comparison to ordinary power frequencies. For example, it is frequently practical to employ power systems utilizing power frequencies of the order of 400 cycles per second, such as in aircraft. In these known types of systems, stability of the output power is obtained by producing some form of feedback from the load to the source of switching signals such that the switching signals will be modified in a direction to compensate for changes in load. Such systems, however, exhibit certain disadvantages. For example, the filter design is relatively restricted to one which will not affect the energy fed back to control the switching rate. Further, the switching rate which is dependent upon the load must be capable of varying over a relatively wide frequency range.

For most alternating current loads, a sine-wave input is preferred. One approach to obtaining a sine wave is to employ a bridge connected silicon controlled rectifier inverter connected to a load through an inductor-capacitor filter while firing or gating the rectifiers for optimum pulse-width selection. It is known in the art that the requirements of the filter can be appreciably reduced by gating the rectifiers for a period of less than 180° relative to the output wave. The known circuits for producing this type gating are relatively complex. These circuits trigger and turn off one serially-connected pair of rectifiers, on opposite sides of the load with cyclically-varying pulse widths equally spaced from adjacent pulses of the same polarity to form the positive half cycle of the output waveform and then the other pair of rectifiers is operated similarly to produce the negative half cycle of the output waveform. Alternatively, the above mentioned bridge-rectifier arrangement may be triggered by alternately gating the rectifiers on opposite sides of the load in pairs with pulses of two different widths and equally spaced from adjacent pulses of the same polarity. Both the bridge arrangement of rectifiers and the firing circuits for triggering the bridge rectifiers with different pulse widths are relatively complex and therefore expensive.

Accordingly, it is an object of this invention to provide an improved high frequency switching power amplifier or static inverter having an output waveform closely approximating a sine wave.

It is another object of this invention to provide an improved parallel connected high frequency static inverter having an output waveform closely approximating a sine wave.

Still another object of this invention is to provide an improved firing control circuit for a parallel connected semiconductor static inverter.

A further object of this invention is to provide a high frequency static inverter particularly suitable for delivering an output into an inductive load.

Yet another object of this invention is to provide an improved switching power amplifier which is reliable in operation, simple in construction, and maintains a substantially constant sine-wave voltage output without the requirement of feedback from the load.

Briefly, in accordance with aspects of this invention, a combination of a high frequency oscillator and a low frequency oscillator are employed to produce switching control signals in which the low frequency signal is superimposed on the high frequency signal and the resultant composite signal is applied to the firing circuit of a parallel connected static inverter as a "programmed" series of spaced pulses of alternate polarity. These pulses are programmed in the sense that the spacing or time interval between pulses varies cyclically. The resultant programmed firing of the inverter causes a pulse width modulated signal which, at the output of the inverter, is a substantially square wave. Advantageously, the pulses vary cyclically in both duration and spacing between pulses of the same polarity. As the pulses of one polarity increase in width or duration, the pulses of the other polarity decrease in width or duration and vice versa. This square wave pulse width modulated signal is fed through a suitable filter circuit, which may be merely an inductance and from the filter circuit it is fed to the load. Alternatively, the modulated signal may be fed directly into an inductive load. The signal appearing at the load closely approximates a sine wave and corresponds in frequency to the low frequency oscillator.

These and various other objects, features and advantages of the invention will be more clearly understood from a reading of the detailed description in conjunction with the drawing in which.

Figure 1:
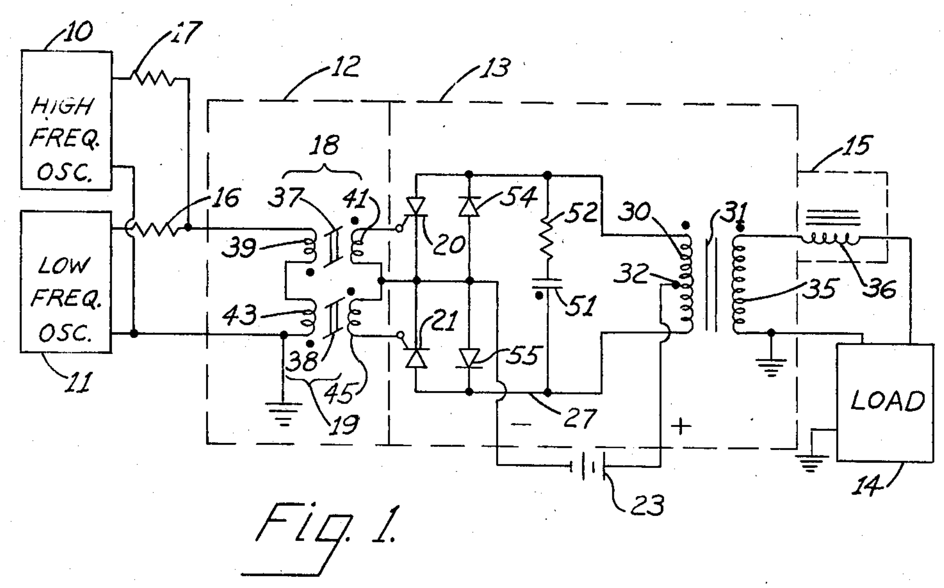
FIGURE 1 is a combined block and schematic diagram of one illustrative embodiment of this invention.

Referring now to the drawing, one embodiment of the invention is illustrated in combined block and schematic form in which a high frequency oscillator 10 and a low frequency oscillator 11 are coupled in parallel to a nonlinear impedance firing circuit 12 for a static switching inverter 13 for the purpose of supplying alternating current power at a frequency corresponding to that of oscillator 11 to a load 14 through a suitable filter 15. For the purposes of explanation, it will be assumed that it is desired to feed an alternating current to the load 14 of 400 cycles per second and for this purpose, the reference low frequency oscillator 11 is constructed and designed to provide an output signal of 400 cycles. Alternatively, the signal frequency delivered to the load 14 may be varied by varying the frequency of the oscillator 11.

The output circuit of oscillator 11 includes a decoupling resistor 16 and the parallel connected output from oscillator 10 also includes a decoupling resistor 17. The outputs of oscillators 10 and 11 are connected in parallel to nonlinear impedance firing circuit 12 for the static inverter 13 which includes a pair of saturable core transformers 18, 19. These transformers are connected to "trigger"

or "gate" a pair of parallel connected silicon controlled rectifiers 20, 21 in accordance with programmed, spaced pulses of alternate polarity produced by transformers 18, 19 in response to the composite signal resulting from superposition of the output signals from oscillators 10 and 11. Advantageously, because of the particular programming, a pulse width modulated, square wave, constant amplitude, rectifier output is obtained which contains a relatively large amount of power and is relatively easy to filter. The anodes of silicon controlled rectifiers 20, 21 are connected to opposite ends of a winding 30 of a transformer 31, which winding has a center tap 32 connected to the positive terminal of a direct current source 23, indicated as a battery. The negative terminal of battery 23 is connected to the common cathode terminal of the silicon controlled rectifiers 20, 21. The alternate gating of the silicon controlled rectifiers 20, 21 will therefor alternately control the flow of direct current through opposite halves of the center tapped winding 30. This alternate flow of direct current through the center tapped winding 30 will produce an alternating current signal in the output winding 35 of the transformer 31. This output signal may be fed through a simple filter such as a choke 36 to the load 14 or fed directly to the load if the load is inductive. The inductive load or the choke, as the case may be, integrates the pulse width modulated square wave output, i.e., averages the net difference in the areas of the positive and negative square wave output.

Each of transformers 18 and 19 includes a square loop core such as the cores 37, 38 and each has an input winding such as the windings 39 and an output winding such as winding 41, both on core 37. Transformer 19 has an input winding 43 and an output winding 45 on its core 38. It is to be noted that the input windings, 39, 43 are connected in series and the dot convention indicates that they are wound in the same direction. The output windings 41, 45 are connected in series between the gate electrodes of the silicon controlled rectifiers 20, 21 and the common connection between these output windings is connected to the cathodes of the silicon controlled rectifiers 20, 21. As indicated by the dot convention, these output windings are wound in the same direction. Because of the substantially square loop hysteresis curve of the cores 37, 38, the voltages fed from the oscillators 10, 11 will be mixed or superimposed in a manner well-known in the art. For the purposes of explaining the operation of this voltage mixing, and its effect upon the firing of the static switching inverter 13, it would be assumed that the oscillator 10 oscillates at a frequency of the order of 4,000 to 5,000 cycles per second. The parallel static inverter includes a capacitor 51 serially-connected to a resistor 52 and this series circuit is connected in parallel with the primary winding 30 of the transformer 31 to improve the wave form resulting from the switching action of the silicon controlled rectifiers 20, 21. The static inverter also includes the conventional diodes 54, 55 connected in parallel and in polarity opposition with the respective silicon controlled rectifiers 20, 21 in a manner well-known in the art for the purpose of bypassing reactive currents which might otherwise damage the controlled rectifiers. This type of parallel inverter is well-known in the art. One example of a similar inverter is shown and described in the General Electric SCR Manual, third edition, pages 164–167.

Figure 2:
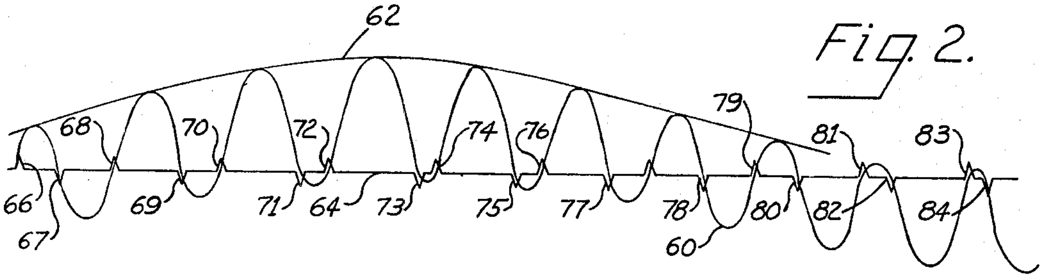
FIGURE 2 is a time plot of the superimposed high and low frequency signals and superimposed firing pulses in accordance with portions of the embodiment of FIGURE 1; and, FIGURE 3 is a time plot of waves corresponding to time to the waveform shown in FIGURE 2.
Figure 3:
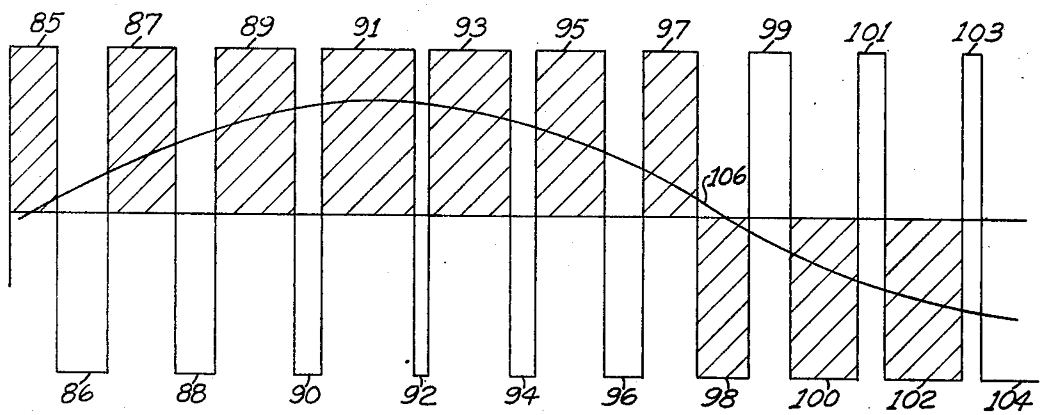

The operation of the apparatus shown in FIGURE 1 will now be described in conjunction with the waveforms shown in FIGURES 2 and 3. In FIGURE 2 the composite waveform 60 is a 400 cycle alternating current wave form, shown separately as curve 62, on which is superimposed a 5,000-cycle per second output wave corresponding to the output of the oscillator 11. Both of these waveforms are drawn with respect to a zero reference line 64. Because this compoiste wave form 60 appears across the primary or input winding 39, 43 of the nonlinear impedance saturable core reactors 18, 19, respectively, which act as switching means, an output pulse from the transformers will be produced each time the cores are switched from one degree of remanent magnetization to the other, in a manner well-known in the art. Thus each time the composite waveform 60 crosses the zero reference line 64, a small spike-like pulse such as pulses 66 through 84 will be produced. These pulses are alternate in polarity and are sufficient to trigger or gate the silicon controlled rectifiers 20, 21 in alternate relationship. The conduction of the silicon controlled rectifiers in a selective fashion will result in a square wave pulse width modulated inverter output in the form of pulses 85–104 (FIGURE 3) at the anodes of the silicon controlled rectifiers.

It will be noted that the pulse widths vary cyclically. The positive pulses 85–91 are increasing in width while negative pulses 86–92 are decreasing in width. After pulse 91, the positive pulses 93–103 decrease in width and negative pulses 94–104 increase in width. The filter or inductive load, as the case may be, integrates the pulse width programmed square wave output, i.e., averages the net difference in the areas of the positive and negative square wave output.

This square wave inverter output appears across the primary winding 30 of the transformer 31 and produces an alternating signal 106 in the output winding 35. It will be apparent to those skilled in the art that the pulse widh modulated wave form has a greater predominance of fundamental component than if the output pulses were of the same width and were evenly spaced relative to pulses of the same polarity and in the same pulse group. This predominance of the fundamental and reduction of the harmonic components simplifies the problem of filtering the output to the load. The serially-connected choke 36 in the circuit with the output winding 35 produces an integrating effect upon the output signal such that the output signals resemble the solid line 106 shown in FIGURE 3. It is to be noted that this solid line 106 closely approximates a sine wave and corresponds in frequency to the frequency of the low frequency oscillator 11.

The output voltage can be regulated by varying the magnitude of the lower or reference frequency oscillator 11. Though the carrier frequency voltage of oscillator 10 remains or can remain the same in magnitude, a change in the magnitude or amplitude of the undulating voltage wave can increase or decrease the difference in the areas of the positive and negative half waves of the square wave output. For example, if the amplitude of the low frequency voltage wave 62 is reduced almost to zero, the output voltage will also be reduced almost to zero because the average or integrated value of the net difference in the areas of the positive and negative half waves is almost zero.

In the preferred embodiment, the amplitude of the carrier signal from oscillator 10 is equal to or greater than one half the amplitude of the signal from oscillator 11. Also, in the preferred embodiment, the frequency of oscillator 10 is at least three times the frequency of oscillator 11. Higher frequencies of carrier signal may be employed and the upper frequency limit is determined primarily by the switching capabilities of the controlled rectifiers and magnetic cores.

While one illustrative embodiment of this invention has been shown and described in detail, it is understood that the concepts thereof can be employed in other embodiments without departing from the spirit and scope of this invention.

What is claimed is:

1. In a high frequency switching power amplifier the combination comprising:

a first source of alternating current;

a second source of alternating current having an output frequency greater than said first source;

means for mixing said currents to produce a composite signal;

switching means including a pair of square loop core transformers each having primary and secondary windings, each having its primary winding coupled to said mixing means to receive said composite signal, said primary windings being serially connected;

a parallel connected static inverter including a pair of control leads, each connected to one of said secondary windings; and, an alternating current load coupled to the output of said inverter and adapted to be powered by alternating current of a frequency of said first source.

2. In an apparatus for producing an alternating current by programmed pulse width selection of a static converter, the combination comprising:

a first source of alternating current of frequency F1;

a second source of alternating current of frequency F2 where F2 is greater than F1;

means for mixing said currents to produce a composite signal;

switching means coupled to said mixing means and responsive to said composite signal for producing a plurality of spaced pulses each indicative of a zero reference line transition of said composite signal, said switching means including a pair of pulse transformers each having a core with a substantially square hysteresis loop, an output and an input winding, said input windings being serially connected to each other and to said mixing means for receiving said composite signal;

a parallel connected static inverter including a pair of semiconductors each having a gating lead connected to the output of said switching means;

an alternating current load adapted to be powered by an alternating current of frequency F1; and, means coupling said load to said static inverter.

3. The combination according to claim 2 wherein said semiconductors are silicon controlled rectifiers, each having a gate and cathode connected to opposite ends of a respective one of said output windings and wherein said inverter includes a transformer having a center-tapped primary winding and a secondary winding, opposite ends of said primary winding being connected to the anodes of said silicon controlled rectifiers, said secondary winding being coupled to said load.

References Cited

UNITED STATES PATENTS

| | | | |
|---|---|---|---|
| 2,990,516 | 6/1961 | Johannessen | 330—10 |
| 3,167,720 | 1/1965 | Sharma | 330—10 |
| 3,253,228 | 5/1966 | Montner | 330—10 |
| 3,334,292 | 8/1967 | King et al. | 321—45 |
| 3,346,794 | 10/1967 | Stemmler | 321—9 X |
| 2,440,320 | 4/1948 | Young | 332—12 |
| 3,026,504 | 3/1962 | Aurand et al. | 332—12 X |
| 3,400,334 | 9/1968 | Ross et al. | 330—10 |
| 3,406,328 | 10/1968 | Studtman | 321—45 |

LEE T. HIX, Primary Examiner

W. H. BEHA, Jr., Assistant Examiner

U.S. Cl. X.R.

321—45; 330—10; 332—12